Nov. 1, 1955 S. J. BEGUN 2,722,676

MAGNETIC INFORMATION-STORING DEVICE

Filed July 25, 1952 4 Sheets-Sheet 1

INVENTOR.
SEMI JOSEPH BEGUN
BY Harry C. Page
ATTORNEY

Nov. 1, 1955 S. J. BEGUN 2,722,676

MAGNETIC INFORMATION-STORING DEVICE

Filed July 25, 1952 4 Sheets-Sheet 2

INVENTOR.
SEMI JOSEPH BEGUN

BY Harry C. Page.

ATTORNEY

MAGNETIC INFORMATION-STORING DEVICE

Filed July 25, 1952

4 Sheets-Sheet 3

INVENTOR.
SEMI JOSEPH BEGUN
BY Harry C. Page
ATTORNEY

MAGNETIC INFORMATION-STORING DEVICE

Filed July 25, 1952 4 Sheets-Sheet 4

INVENTOR.
SEMI JOSEPH BEGUN
BY Harry C. Page
ATTORNEY 2,722,676
Patented Nov. 1, 1955

2,722,676

MAGNETIC INFORMATION-STORING DEVICE

Semi Joseph Begun, Cleveland, Ohio, assignor, by mesne assignments, to Clevite Corporation, Cleveland, Ohio, a corporation of Ohio Application July 25, 1952, Serial No. 300,933
18 Claims. (Cl. 340—174)

Figures 1, 5:
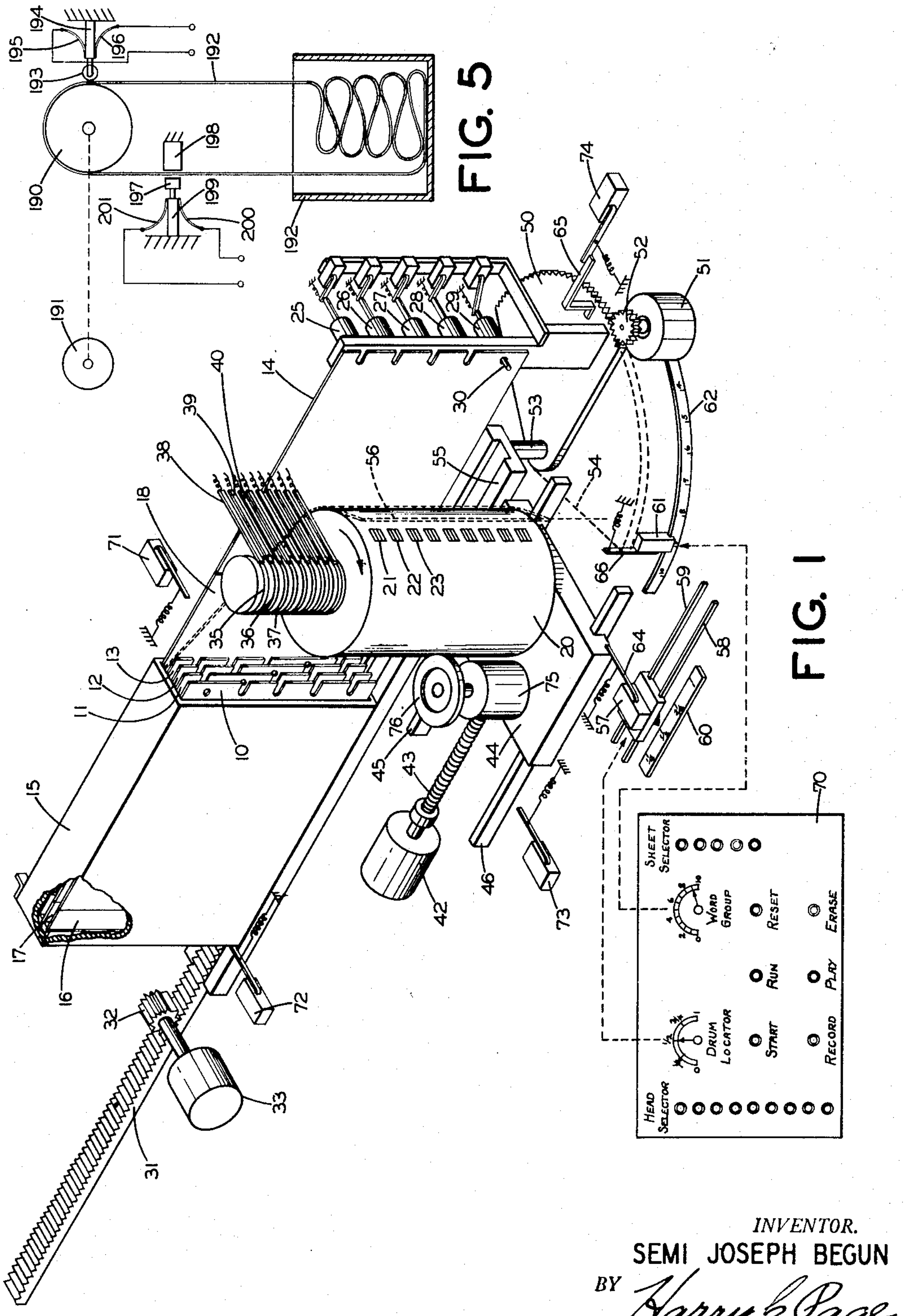

The present invention relates to magnetic information-storing devices of the general type known as magnetic recorders or reproducers and relates specifically to a magnetic information-storing device in which a large amount of information can be stored in such a manner that any selected portion of the information can be reproduced very rapidly if desired.

Magnetic recording and reproducing equipment has come into an increasing degree of importance in recent years for the storage of information which otherwise would be kept in some other manner. For example, devices in the nature of bookkeeping systems have been proposed wherein information as to an entire stock of merchandise is recorded magnetically so that it can be reproduced as desired. At the present time the Pennsylvania Railroad system is in the process of installing magnetic devices to be used as an aid in storing and reproducing information relating to the availability of space on Pullman trains. Also, in the recent past, magnetic recording has been used to a considerable extent as a memory device in connection with electronic calculating and computing devices, the purpose of the magnetic storage feature being to store information which is necessary in the solution of a given problem and to provide the information for the electronic equipment when such information is needed.

In all such devices of the type under consideration here, the access time to the stored information is very important. In many magnetic recording and reproducing devices of the prior art, it has been customary to provide a fast-wind or a fast-rewind on a tape or wire device so that access time to a particular piece of information can be reduced to a minimum. However, in such devices, it is customary to cause the whole magnetic record member to be in motion while a particular piece of information is being reproduced from the machine. This means, of course, that in order to have any portion of the information available it is necessary to move the entire record member in order to obtain access to the desired portion and that thereafter it is necessary to move the entire record member in order to reproduce the desired portion of information. It is one of the purposes of the present invention to provide an arrangement in which this difficulty is not present.

Furthermore, in many of the installations of the type under consideration, it is desirable to display the information which is magnetically recorded on a display device, such as a cathode-ray tube, and in such cases a periodic reproduction of the stored information is desirable in order to provide a continuous display from the cathode-ray tube. In most of the prior-art magnetic recording and reproducing devices mentioned above, the record member moves past a head in the reproducing operation and this necessarily means that the information is available only once during any particular period during which the machine is consulted. Applicant, by his invention, has provided a device in which the record member itself can be stationary while it is being recorded upon or while the desired information is being reproduced and, furthermore, has provided a device which, by its very nature, can easily provide specific portions of the stored information on a repetitive basis.

It is an object of the invention, therefore, to provide an improved magnetic information-storing device.

It is a further object of the invention to provide a magnetic information-storing device which is capable of storing a large amount of information and one in which the access time to the information stored can be reduced to a minimum.

It is still another object of the invention to provide a magnetic information-storing device which is capable of storing a large amount of information and in which any selected portion of the information can be quickly and repeatedly reproduced.

In accordance with the invention, a magnetic information-storing device comprises a plurality of sheet-like record members and a drum having a given axial dimension and a given circumferential dimension. A plurality of magnetic heads, each having a transverse dimension which is small with reference to the axial dimension of the above-mentioned drum, are provided and this plurality of heads is effectively axially displaced in the surface of the drum. The device also comprises a means for positioning the drum and a selected one of the above-mentioned record members for a magnetic transducing operation by any of the heads, together with an electrical signal-translating means effectively connected to one of the heads. In addition, means are provided for driving the drum to cause the above-mentioned head to scan a given line on the selected record member in the circumferential dimension of the drum to effect a magnetic translation of the signal carried by the above-mentioned signal-translating means. By this arrangement, the line associated with the head on selected ones of the record members may be magnetically transduced. In one embodiment of the invention, an electrical signal-translating means is provided together with means for effectively connecting any selected one of the heads in the drum to this signal-translating means. Also, in a preferred embodiment of the invention, means are provided for causing the signal-translating means and selected head to translate during only a selected portion of the time this given line is being scanned to effect a magnetic translation of the signal carried by the above-mentioned signal-translating means during only said selected portion of time.

For a better understanding of the present invention, together with other and further objects thereof, reference is had to the following description taken in connection with the accompanying drawings, and its scope will be pointed out in the appended claims.

Figure 2:
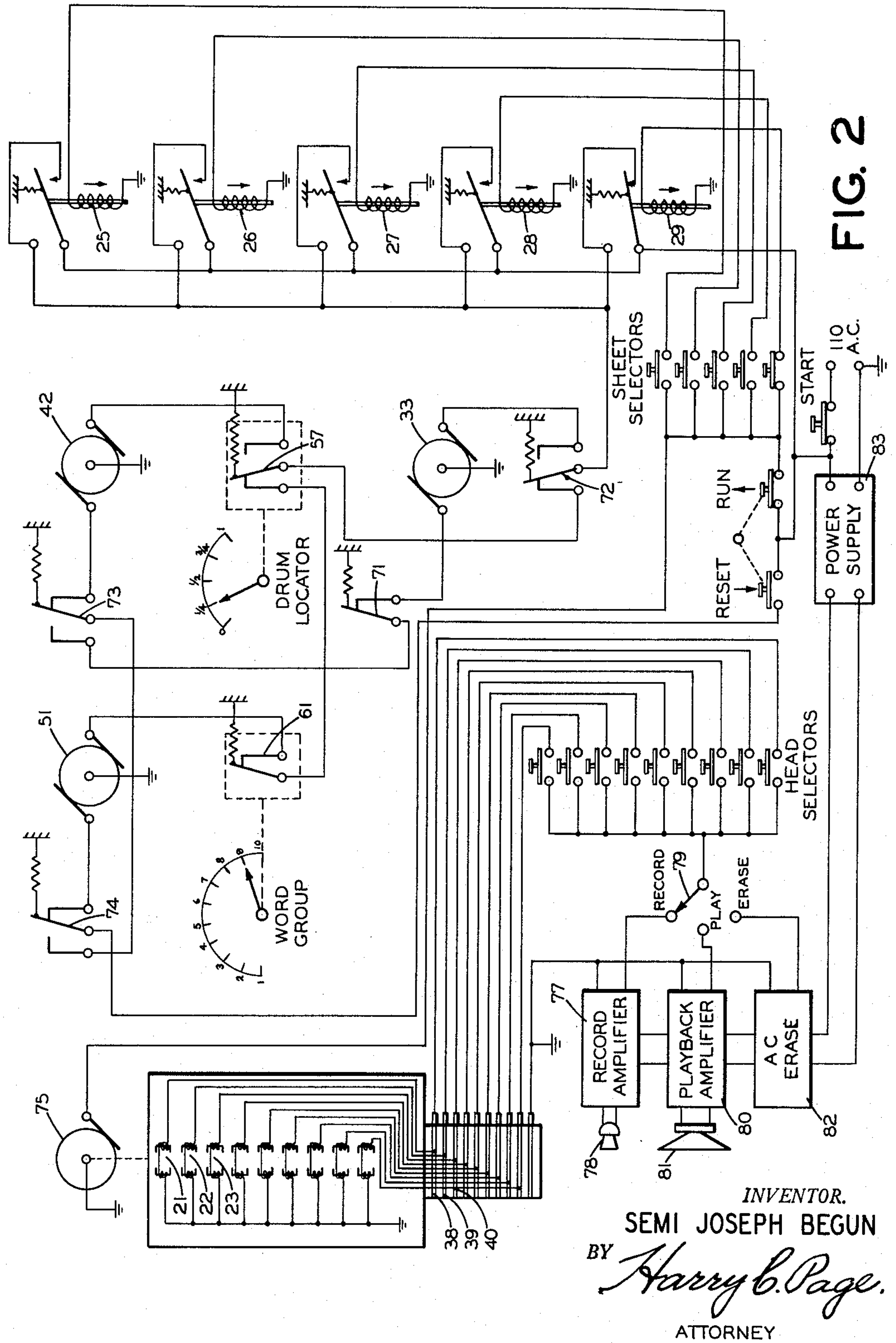
Figure 3:
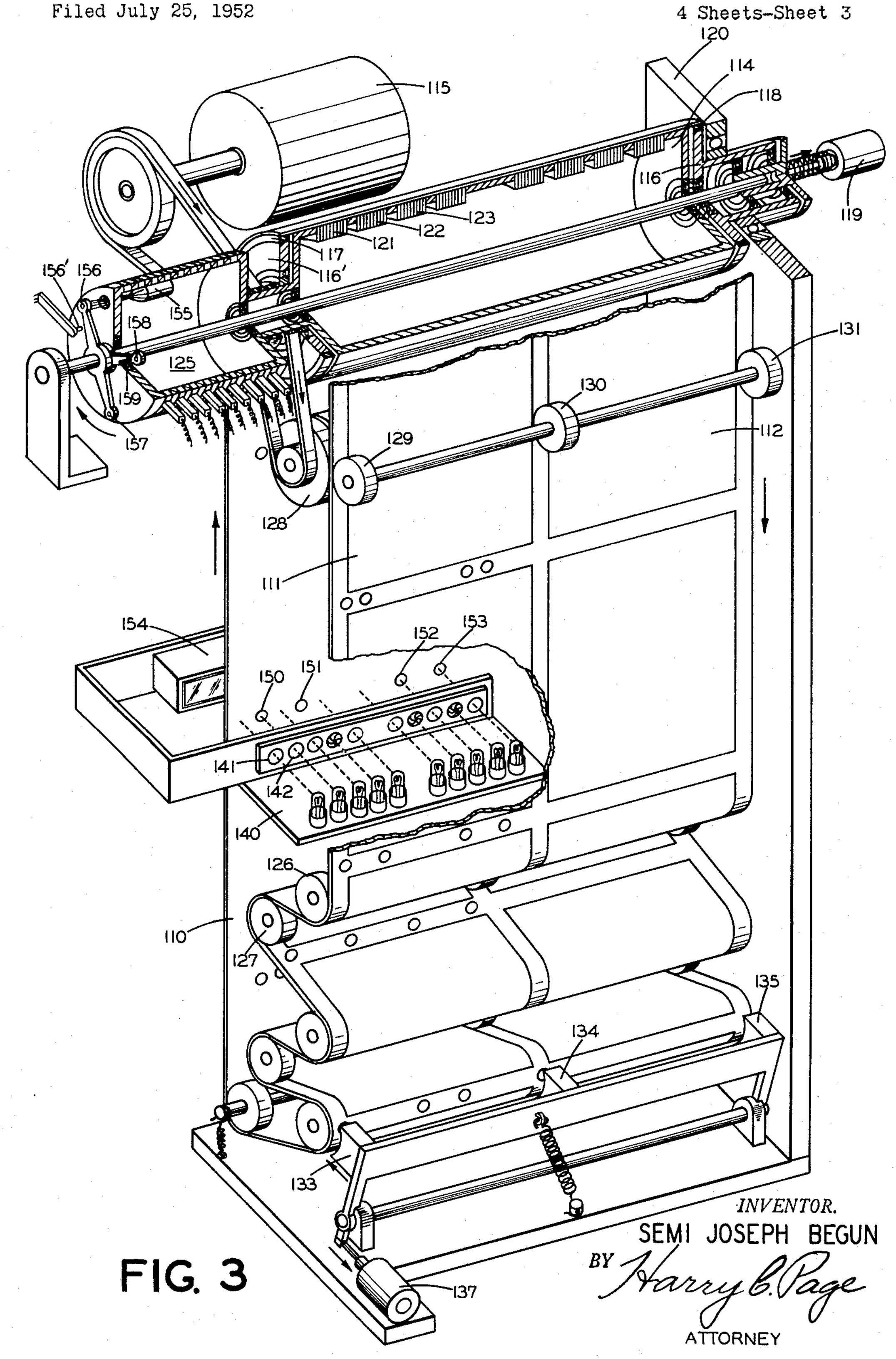
Figure 4:
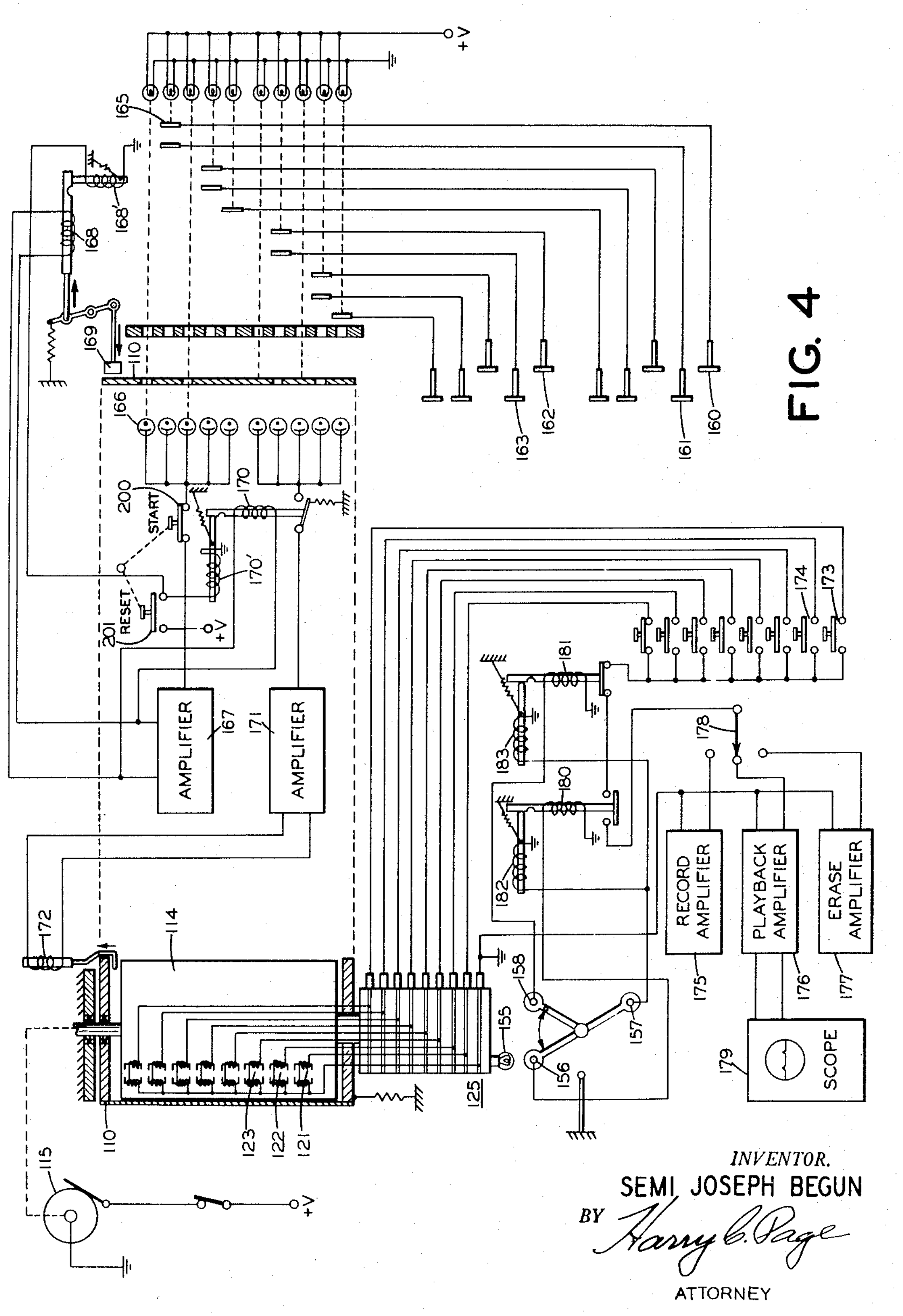

Fig. 1 of the drawing illustrates a preferred embodiment of the invention;

Fig. 2 comprises a circuit diagram for the embodiment of the invention illustrated in Fig. 1;

Fig. 3 illustrates another preferred embodiment of the invention;

Fig. 4 comprises a circuit diagram for the embodiment illustrated in Fig. 3; while Fig. 5 illustrates schematically how portions of the embodiment of the invention illustrated in Fig. 3 may be modified to provide a very fast-acting device.

Referring now more particularly to Fig. 1 of the drawings, the embodiment of the invention which is illustrated there is somewhat analogous to a system of books or ledgers when utilized as a bookkeeping machine. Specifically, the device comprises a plurality of sheet-like record members 10, 11, 12, 13 and 14, upon which information may be recorded magnetically. The record sheets 10–14 inclusive are normally contained within a housing or cover 15 and are spring-biased so that each sheet returns to the box 15 at any time it is released after being pulled out of the box. The device to be described is illustrated in Fig. 1 in a condition of operation where sheet 14 has been pulled out of the box 15. This has been done simply for the sake of clarity of illustration and it will be understood that sheet 14 is normally also contained within the box 15 and that the box 15 normally occupies a position toward the right of the drawing, as will be brought out more fully hereinafter. The sheet 14 may be of any suitable magnetic-recording material which is sufficiently thin, flexible and durable for the intended purpose. For example, the magnetic record members may be of sheet magnetic metal or maybe plastic or paper having a magnetic coating thereon. Each of the sheets 10–14 inclusive is attached to a rubber sheet 16, 17, 18, etc., adapted to retain the sheet within the box 15 unless it is forcibly pulled therefrom. It will be understood that, if desired, another box of record sheets may be substituted for the box 15 in the device illustrated and that this is analogous to the changing of books in a ledger system.

The device illustrated includes a drum 20 which carries a plurality of magnetic heads 21, 22, and 23 which are effectively axially displaced in the surface of the drum. Each such head has a transverse dimension which is small with reference to the axial dimension of the drum so that a plurality, and preferably a large plurality, of heads can be contained along the length of the drum. Nine such heads are shown in Fig. 1 and it will be understood that the purpose of each such head is to scan a particular line of the record sheet which is positioned for scanning, as is sheet 14 in the Fig. 1 illustration.

A means is provided for positioning the drum 20 and a selected one of the record members in box 15 for a magnetic transducing operation by any of the heads. It will be recalled that the box 15 normally is in a position directly behind the drum 20 and that all of the record sheets are within the box. Under these conditions, the desired record sheet can be selected by the energization of any one of a number of solenoids 25, 26, 27, 28 or 29. In selecting the desired record sheet, a pin driven by the solenoid enters a hole in the selected sheet so that the sheet may be withdrawn from the box 15. All other sheets in the series have slots at the position corresponding to the hole in the selected sheet and thus are not affected by the action of the pin on the selected sheet. Thus, as illustrated in Fig. 1, solenoid 29 has been energized to cause the pin 30 to enter the hole in record sheet 14. Thereafter, the box 15 has been removed from its position directly behind the drum 20 to the position in which it is illustrated, thus causing sheet 14 to be held in position and to be withdrawn from the box 15 as the box 15 is moved. Box 15 is moved between the two positions mentioned above by means of a rack 31 which is driven by a gear 32 which is in turn driven by a motor 33.

It will be understood that a particular line of the magnetic record member 14 can be scanned by a particular selected one of the heads 21, 22, 23, etc. and that a recording, reproducing, or erasing operation may be effected in the scanned line during the time the line is scanned. In order to apply or derive an electrical signal with any selected one of the heads 21, 22, 23, etc., it is necessary that the electrical circuits from these heads be brought out from the rotating drum 20 and, for this reason, a plurality of slip rings 35, 36, 37, etc. having co-operating brushes 38, 39, 40, etc. are provided. A number of the mechanical features and a number of the electrical features have been omitted or simplified in the arrangement of Fig. 1 for the sake of clarity but a complete operating diagram of the Fig. 1 arrangement will be described in connection with Fig. 2.

In order to select the beginning of the portion of the scanned line at which the selected head 21, 22, 23, etc. is effective, an arrangement is provided for traversing the drum 20 along the selected record member, such as 14, illustrated. This is done by means of a motor 42 and a screw 43 which are effective to position the head by driving a platform 44 upon which the drum 20 is mounted, the platform 44 being slidable along ways or bars 45, 46. An arrangement is also provided for wrapping the selected sheet around the drum 20 so as to cause a larger portion of the record member to be affected by the rotating heads 21, 22, 23, etc. This arrangement in Fig. 1 comprises a rack 50 which is driven by a motor 51 and gear 52. The rack 50 carries the solenoids 25–29 inclusive and is pivoted upon a pin 53. Pin 53 is suspended from the way or slide 55 upon which the box 15 is mounted and slides between its two positions. It will thus be seen that motor 51 can be used to drive the record sheet from the position shown to the position illustrated by the dotted line 56, for example. An arrangement is provided for adjusting the position to which the drum 20 may be moved along the sheet 14 by the motor 42. Also, a means is provided for selecting the amount of wrap to be given to the sheet 14 when it is wrapped around the drum 20. Thus a limit switch 57, slidable along ways 58 and 59, is provided to stop the motor 42 when the drum 20 has been driven along the sheet 14 to a selected position. The limit switch 57 is manually adjustable along the ways 58 and 59 and a suitable scale 60 is provided in conjunction therewith for illustrating the position at which the limit switch 57 is set. Similarly, a limit switch 61 is provided for stopping the motor 51 when the sheet 14 has been wrapped around the drum 20 to a selected position. The switch 61 is slidable along a track 62 so that the amount of wrap of sheet 14 around the drum 20 may be adjustably selected. Limit switch 57 is operated when contact arm 64 is moved by the platform 44 as the motor 42 drives the platform. The limit switch 61 is operated when the stop 65 moves the limit switch contact arm 66 of switch 61.

A control station 70 is provided for the arrangement of Fig. 1. A number of buttons on the control station are provided so that an operator can first select a desired sheet then select the line to be scanned and then select the portion of the line to be recorded upon, reproduced from, or erased. Thus the control station 70 has five buttons arranged under the designation "Sheet selector." By pushing one of these buttons, a selected one of solenoids 25–29 can be energized, thus selecting the sheet which will be pulled from the box 15 when the motor 33 is energized to retract the box from its position behind the drum. As illustrated, the solenoid 29 has been energized, causing sheet 14 to be selected. The operator can next select the beginning of the line on the sheet 14 which is to be utilized. This is done by operating the lever designated "Drum locator" which has the effect of moving the limit switch 57 along the ways 58 and 59. As illustrated, the drum 20 is set at the position designated "one-half" so that the heads 21, 22, 23, etc. only contact the sheet 14 at the one-half point on the line being scanned.

The amount of the line to be utilized is determined by the amount of wrap that the selected sheet is given around the drum 20 and this adjustment is made at the control station 70 by moving the lever associated with the legend "Word group." Movement of this lever has the effect of moving switch 61 along the track 62. As illustrated, the lever for selecting the "Word group" is almost at its extreme position and thus, in the position shown for the levers associated with the "Drum locator" and the "Word group" adjustments, the arrangement is effective to scan almost the entire last half of the line selected on sheet 14.

The line which is to be scanned is determined by operating one of a number of push buttons illustrated in control unit 70 under the designation "Head selector." As brought out above, this has the effect of connecting a selected one of heads 21, 22, 23, etc. into the circuit for operation. Other buttons designated "Start," "Run," "Reset," "Record," "Play," and "Erase" are illustrated in Fig. 1 and the manner of their use will be explained in detail in connection with the description of the operating diagram of Fig. 2.

In addition to the limit switches which have so far been described, various other limit switches are provided for the arrangement of Fig. 1. Thus a limit switch 71 is provided for stopping the motor 33 when the box 15 is in its proper position behind the drum 20. The edge of the box 15 contacts the lever arm switch 71 to operate the switch. Also a switch 72 is provided for de-energized the motor 33 when the box 15 is in its proper retracted position, which is the position in which it is illustrated. in Fig. 1. Thus the box 15 is shown in contact with the lever arm of switch 72 to illustrate that the switch has been operated to stop the motor 33 and leave the box 15 in its retracted position. Similarly, when the drum 20 is returned to its initial position by the motor 42, a switch 73 serves to stop the motor 42. The switch 73 is operated when the platform 44, upon which the drum 20 is mounted, contacts the lever arm of the switch 73. A switch 74 is provided for stopping the motor 51 when the selected sheet is unwrapped from the drum 20. The arm 65 contacts the lever arm of switch 74 for this purpose. Since the sheet 14 is illustrated in the position in which it is not wrapped around the drum 20, the lever arm 65 is shown in contact with the operating lever of switch 74. A motor 75 is provided on platform 74 for the purpose of driving drum 20, the drive from the motor 75 to the drum 20 being through a drive wheel 76 which may be of rubber.

A description of the circuit of the device of Fig. 1 will be given with reference to Fig. 2. Elements of Fig. 2 which correspond to those of Fig. 1 bear similar reference numerals. In addition to the elements which have been designated by reference numerals in Fig. 1, Fig. 2 shows an additional number of elements; specifically, a record amplifier 77 is illustrated, to which is connected a microphone 78, the record amplifier being adapted to be connected into the circuit by the operation of a three-position switch 79 to the position designated "Record." A playback amplifier 80 is also illustrated to which is connected a reproducing device which is illustrated as a loudspeaker 81. Playback amplifier 80 is adapted to be connected into the circuit when the switch 79 is operated to the position designated "Play." An erase amplifier 82 is adapted to be connected into the circuit when the switch 79 is in the position designated "Erase." The designations of the switch 79 and of the various other switches and selectors correspond with those of unit 70 of Fig. 1. A power supply 83 is provided for units 77, 80, and 82. The record amplifier 77 and microphone 78 comprise an electrical signal-translating means, and likewise the playback amplifier 80 and loudspeaker 81 comprise an electrical signal-translating means. Either may effectively be connected to the magnetic head, one for recording on the record member and the other for reproducing from the record member.

In considering the operation of the circuit of Fig. 2, it will be assumed that the various elements are in the position illustrated in Fig. 1. This means that the proper sheet-selector circuit has been closed to energize relay 29. Furthermore, the start button is shown in the operating position, as is also the button designated "Run." Under these conditions, it will be seen that the relay 29 is effective to select sheet 14 by the operation of relay 29 in the manner described in connection with Fig. 1. Furthermore, power is supplied through the start switch from the voltage source designated 110AC through the switch designated "Run" to contacts associated with solenoid 29 and through the normally closed contacts of the limit switch 72 to the motor 33. Actually the normally closed contacts of limit switch 72 are shown in the open position because of the fact that it has been assumed that the motor 33 has been operated to remove the box 15 from its position behind the drum 20, thus selecting the sheet 14. It is, therefore, the normally open contacts of limit switch 72 which are shown closed in the Fig. 2 illustration. As soon as these contacts are closed, the motor 42 is energized, causing the motor to drive the drum 22 to the position along the record sheet 14 which has been selected by the operation of the switch 57. For the same reason given above the normally open contacts of switch 57 are illustrated as closed in Fig. 2. When the switch 57 is operated, the motor 51 is energized through the contacts of limit switch 61. This has the effect of causing the sheet 14 to be wrapped around the drum 20 to a position corresponding to that at which the "Word group" lever and limit switch 61 are set. At this time the limit switch 61 is opened, thus stopping the motor 51. As so far described, therefore, the device of Fig. 1 has been caused to select a particular sheet 14, and to withdraw the box 15 from its position behind the drum. Also, the motor 42 has driven the drum 20 along the sheet 14 to a position corresponding to the start of the line on the sheet 14 to be utilized and the motor 51 has caused the sheet 14 to be wrapped around the drum by a pre-selected amount determined by the setting of the limit switch 61. Under these conditions, the motor 75, which is energized through the switch designated "Run," is effective to drive the drum to cause all of the heads 21, 22, and 23, etc. to scan only the selected portions of the lines on sheet 14. The head which is to be effective can be selected by the operation of one of the switches designated "Head selector" and the type of operation which is to be effected, namely, a recording, reproducing, or erasing can be selected by the operation of the switch 79. Under these conditions, it is possible to record, reproduce, or erase a selected portion of a selected line on the selected sheet of any of those contained in the box 15.

The above-mentioned analogy to a ledger system will therefore be very apparent because of the fact that the box 15 with its plurality of sheets corresponds generally to a ledger of a ledger system. It will be understood that other boxes may be substituted by removing box 15 and inserting another box in its place. This corresponds to the selection of a particular book in the ledger system. Also, it will be seen that any sheet of the box selected may be utilized corresponding to the use of any page of the selected ledger. Furthermore, any line of the selected sheet may be utilized and, in the preferred embodiment of the invention illustrated in Figs. 1 and 2, any portion of any selected line may be utilized. This, of course, corresponds to the use of a particular portion of a line on the selected page of the selected ledger of the ledger system.

In order to cause all of the elements of the illustrated system to return to their original position, the Reset button of Fig. 2 is operated. This is mechanically interlocked with the Run button so that the Run button is opened when the Reset button is closed. The operation of the Reset button causes power to be supplied to motor 51 through the normally open contacts of limit switch 74, this contact being closed under the assumed conditions. The motor 51 is thus energized in a reverse direction and drives the rack 50 thus tending to unwrap the selected sheet 14 from the drum 20. However, the relay 29 is also de-energized thus allowing the sheet to be withdrawn into the box 15 by the elastic member 18. This unwrapping operation continues until the limit switch 74 is operated. When the normally open contacts of limit switch 74 are closed, indicating that the sheet 14 would have been completely unwrapped from the drum 20, the motor 42 is energized through the normally open contacts of limit switch 73. These contacts are, of course, closed under the assumed conditions and the motor 42 is thus effective to return the drum 20 to its original position, thus closing the normally closed contacts of limit switch 73. At this time, the motor 33 is energized through the normally open contacts of the limit switch 71, thus energizing motor 33, the designated contacts of limit switch 71 being closed under the assumed conditions. The motor 33 is thus driven, causing the box 15 to return to its position behind the drum 20, at which time the normally open contacts of limit switch 71 are opened, stopping the motor 33. All of the motor-driven elements have then been returned to their original position and the device is in a condition for a subsequent operating cycle. This, of course, may comprise the selection of another sheet, another line, and a portion of a line of the record members contained in box 15. It will be understood that the recording, reproducing, and erasing operations under consideration may be completely conventional.

Referring now to Fig. 3 of the drawings, the principle of operation of the device which is there illustrated corresponds generally to that which has so far been described in that the record medium utilized can be considered to be a plurality of sheet-like members, any of which can be selected for operation with the magnetic heads involved. Specifically, the magnetic record here comprises an endless belt 110 which is divided into sections which are in the nature of sheets and are adapted to be acted upon by the magnetic heads in the same general manner as described in connection with the operation of Fig. 1. For example, the rectangle 111 may be considered to be one such sheet-like member and the rectangle 112 may be considered to be another such sheet-like record member. The sheet-like record members are driven by a drum 114 through the medium of a clutching device which will be described in more detail hereinafter. The drum 114 is belt-driven from a motor 115. The record member 110 is therefore driven by the drum and, in order to stop the record member 110 while the drum 114 continues to rotate, two idler wheels 116, 116' are provided. Friction pads 117 and 118 are provided for the idler wheels 116' and 116, respectively, in order to stop the belt 110 while the drum 114 continues to rotate. A spring-biased solenoid device 119 is provided which has the effect, when energized, of pulling idler wheel 116 against the side plate member 120 and providing a braking action. Heads 121, 122, 123, etc. are provided in the drum 114 and correspond to the heads of the drum of the Fig. 1 device. In order that the electrical circuits of the heads 121, 122, 123, etc. may be brought out, a slip ring device 125 with suitable brushes therefor is provided.

The remainder of the drive system of the Fig. 3 device comprises a plurality of idler rollers 126, 127, etc. There is also provided an arrangement for providing an overdrive on the belt 110 in its travel across the drum 114. This arrangement comprises a belt-driven roller 128 against which a plurality of idler wheels 129, 130, and 131 bear, thus acting in the nature of pinch rollers. The purpose of the roller 128 and the pinch rollers 129, 130, 131 is to provide a tension upon the belt 110.

An arrangement for slowing down the belt 110 as a preliminary operation when it is desired to stop the belt at some particular one of sheets of 111, 112, etc., is provided. This arrangement comprises a braking device having shoes 133, 134 and 135, normally spring-biased away from belt 110, but adapted to be pressed against belt 110 when a solenoid 137 is energized.

In order to provide an indexing system whereby a particular one of the sheet-like members 111, 112, etc. can be stopped in a predetermined position with reference to the drum 114, a plurality of lights are provided within the belt, each light being mounted upon a platform 140 and being adapted to supply light to the belt through apertures 141, 142 etc. also carried by a member supported on platform 140. A series of coded holes 150, 151 etc. are provided in the belt 110 as a part of the indexing system. Furthermore, in a preferred arrangement, a second series of holes comprising holes 152, 153, etc. are provided for use in providing a slowing action on the belt 110 as a preliminary operation before the belt 110 is actually stopped with a particular sheet member 111, 112 etc. opposite drum 114. The various lights mounted upon platform 140 thus supply light through the apertures 141, 142 etc. and through the apertures in the belt 110 to a photocell device included in housing 154 and supported behind the belt 110 rigidly with the platform 120. The member carrying apertures 141, 142 etc. is adjustable so that particular combinations of the apertures may be opened.

In order to key any of the heads 121, 122, 123 into the circuit of the magnetic recording, magnetic reproducing, or magnetic erasing devices during only a portion of the time the selected head is scanning a particular line, a light source 155 is provided inside the housing of device 125. This light source provides illumination to a plurality of photocells 156, 157 and 158 which are mounted on arms so that each photocell is supplied with illumination from the light 155 through an aperture in the structure 125 as it is rotated, it being understood that this structure rotates with the drum 114. The arms supporting the photocells 156, 157 and 158 are stationary in operation but can be angularly adjusted to any desired position in order to provide a keying action for a desired portion of the line being scanned by a selected head. The arrangement, however, is such that the arms supporting photocells 156 and 157 are rigidly connected to move as a unit. The arm supporting photocell 158, however, is separate and can be moved independently of the arms supporting photocells 156 and 157. However, a pin 159 is provided so that the arm supporting photocell 158 cannot be moved beyond the arm supporting photocell 156 in one direction or beyond the arm supporting photocell 157 in the other direction. A stop pin 156' is provided to limit the total movement of photocells 156 and 157. Thus cell 156 contacts the pin 156' to limit the movement in one direction and cell 157 contacts the pin 156' to limit the movement in the other direction.

The coded holes which are illustrated in the tape 110 of Fig. 3 are based on a system in which the first two holes of a series of five are used in selecting sheet-like members 111, 112, etc. The first and third holes are used in selecting the next sheet-like member. The first and fourth holes are used in selecting the next sheet-like member and the first and fifth holes are used in selecting the next sheet-like member. In continuing the illustration, the next sheet-like member is selected by the use of the second and third holes and the following is selected by the second and fourth holes, etc. It will be understood that any system of coded holes can be utilized and that the system shown has been selected primarily for the ease with which it can be illustrated. It will also be understood that the coded holes in the series in which apertures 150, 151 are included is illustrated in the drawings as being the same kind of a code as the series of holes in which apertures 152 and 153 are included. Again it is emphasized that one series of holes is utilized to slow down the belt when it is desired to stop a particular sheet-like record member 111, 112 for cooperation with drum 114 and the other series of coded holes in which apertures 152 and 153 are included is utilized to stop the desired sheet-like record member at a precise position. It will be understood that it is not necessary that the slowing action and the stopping action mentioned be effectuated at the same specific belt position in each case as is illustrated in the drawing. In other words, the two series of coded holes in the belt can be relatively displaced with reference to each other. In fact, in a preferred arrangement it would not be necessary for the belt to make a complete revolution when the controls are operated to slow down the belt to stop it with a particular one of the sheet-like members 111, 112, etc. in place on the head 114 before the other holes in the belt are active for the purpose of stopping the belt.

In Fig. 4 there is shown a circuit diagram for the Fig. 3 embodiment of the invention. It will be understood that a number of the electrical elements of Fig. 3 have been omitted for the sake of clarity. It will also be understood that certain portions of the Fig. 3 arrangement are shown schematically in Fig. 4. Thus the apertures which may be selected in the Fig. 3 device are shown in Fig. 4 as being operated by push buttons 160, 161, etc. in the first series and 162, 163, etc. in the second series. These push buttons are shown as moving corresponding masks in front of the series of lights shown on the right-hand portion of Fig. 4. These lights correspond generally to the series of lights mounted on support 140 in Fig. 3. Thus push button 160 can be used to adjust the position of mask 165 etc. As illustrated in Fig. 4, the first and third push buttons of the series including push buttons 160, 161 etc. are depressed in the first series of keys and the corresponding ones are also depressed in the second series of keys. The depressing of push button 160, for example, allows light to pass to the upper photocell 166. The arrangement of Fig. 4 is such that no control action is effected unless two of the photocells in the series including photocell 166 receive light.

Connected to the output circuit of the first series of photocells is an amplifier 167, the output of which is used to energize a solenoid 168, thus applying the brake shoe 169 to the belt 110. A "start" switch 200 is included in the circuit to amplifier 167. Relay 168 is of the self locking type but can be reset to its initial position by the energization of a solenoid 168′ through a "Reset" switch 201. The switch 201 is mechanically interlocked with the switch 200. The output of amplifier 167 is also utilized to energize a solenoid 170 which closes contacts in the circuit of the second series of photocells supplying an amplifier 171. The device 170 is also of the self-locking type and can be reset by the energization of a solenoid 170′. The output circuit of amplifier 171 is adapted to energize a solenoid 172 which provides a braking action for the tape 110. The brake including the solenoid 172 thus corresponds to the brake of Fig. 3 which includes the solenoid 119.

The drum 114 of Fig. 4 is illustrated as carrying heads 121, 122, 123, the heads being shown in schematic form. The drum 114 is driven by the motor 115 to which voltage is supplied from a suitable voltage source. The slip rings through which the circuits of heads 121, 122, 123 are brought out is shown in schematic form and is designated by the reference numeral 125. Light for the photocells included in arms 156, 157 and 158 is provided by the light source 155 which is carried by the slip ring structure 125. A series of push buttons 173, 174, etc. are provided in order that any of the heads of drum 114 may be connected to the electrical signal-translating means which is to be used in the system. Thus the heads can be selectively connected to a record amplifier 175, a playback amplifier 176, or an erase amplifier 177 by means of the operation of three-position switch 178. An oscilloscope 179 is connected to the output circuit of playback amplifier 176 and it will be understood that a suitable signal to be recorded is provided to record amplifier 175.

In order to cause the selected head of drum 114 to be effective during only a selected angular portion of its by light source 155. The solenoid-operated devices 180 and 181 are provided having contacts in the circuit supplying switch 178. The contacts of solenoid 180 are normally open and the contacts of solenoid 181 are normally closed. The solenoid 180 is energized when the photocell 156 receives light from light source 155 and the solenoid 181 is energized when the photocell 158 is energized by light source 155. The solenoid-operated devices 180 and 181 are such that they lock in their energized positions and a trip circuit for each is provided by means of solenoids 182 and 183, these solenoids being energized when photocell 157 receives light from source 155.

In considering the operation of the circuit which has just been described, it will be assumed that the first and third push buttons in the series 160, 161 etc. and also in the series including 162 and 163 etc. have been depressed. It will also be assumed that the motor 115 is energized to drive the drum 114. Under these conditions the drum rotates and drives the belt 110 at a high speed. The switch 200 is then closed to initiate the operation. When the proper series of coding holes in the belt uncover apertures to admit light to the photocells included in the bank including photocell 166, a signal output will be received from the first and third photocells of the series. Since an output from any of the two photocells in this series will energize amplifier 167, the solenoid 168 is energized thus applying the brake 169 which tends to slow down the belt 110. Simultaneously with the energization of the solenoid 168, the solenoid 170 is energized, closing the input circuit to amplifier 171. In some cases it may be necessary to provide a considerable time delay in the solenoid 170 in order to provide a satisfactory operation. Now when the proper holes in the belt 110 uncover the described apertures, light is again supplied to two of the photocells in the second bank supplying energy to amplifier 171 thus causing brake 172 to be applied. This has the effect of stopping the belt 110 at a specific position with reference to the drum 114. The drum 114, however, continues to rotate and heads 121, 122, 123, etc. scan predetermined lines on the portion of the belt 110 which has been stopped adjacent the drum 114. The depressing of key 173, for example, connects the upper head for operation with the playback amplifier when the switch 178 is in the position shown. Thus, as the drum 114 rotates, light is supplied to photocell 156 which energizes solenoid 180 causing its normally open contact to close, thus effectively connecting the selected head to the playback amplifier 176. This condition continues until light is supplied to photocell 158 by the traveling light source 155, at which time relay 181 is energized, thus effectively disconnecting the selected head from the the playback amplifier 176. Since the solenoid devices 180 and 181 are mechanically locked after the solenoids are energized, this condition continues until photocell 157 is supplied with light from the source 155. At this time solenoids 182 and 183 are energized thus effectively returning the contacts in the head circuit associated with switch 178 to their original positions.

By this arrangement it will be seen that the selected head is connected in the circuit of playback amplifier 176 during only a portion of the time the head is traveling across its path on belt 110. Photocells 156 and 157 can be adjustably positioned together to select the starting point at which the selected head is effective. Photocell 158 can be manually adjusted to any position between photocells 156 and 157 to select the length of path travel during which the selected head is effective. Since switch 178 may also be thrown to the record position or to the erase position, it will be seen that an arrangement has been provided whereby any selected portion of any selected line may be recorded upon, reproduced from, or erased. Furthermore, since the drum 114 is driven at a relatively high speed, it will be seen that the signal is continuously reproduced during each effective scanning by the selected head. This provides a repeating signal which is ideal for use with an oscilloscope and the arrangement of Fig. 4 is thus quite suitable for use in a bookkeeping system in which a number of belts 110 can be provided corresponding generally to the books of a ledger system. For example, the entire inventory of a department store can be kept on such a system of magnetic records. The desired belt can be inserted in the machine and any one of the sheet-like portions of the record member can be selected. Furthermore, any line of the selected sheet-like record member can be selected and, in addition to this, any portion of the selected line can be selected. It will thus be seen that the information corresponding to this portion of the selected record member can be reproduced by the record amplifier. Furthermore, this portion can be erased by the erasing amplifier or changed by the use of the record amplifier. Any selected portion can thus be continuously reproduced on the cathode-ray device 179 when the switch 178 is in the position shown. A numbered scale can be provided with the cathode-ray device 119 and pips in response to recorded pulses can be used to indicate in connection with this scale the number of items of a given type which are present in the inventory of the store.

It will be seen, therefore, that the devices which have so far been described are very flexible and that a vast amount of information can be stored and utilized by means of a suitable indexing system. However, the trend in the art of such devices is towards those which supply the stored information in a very short length of time, called the "access time." Such devices are particularly useful in electronic calculators and computators as mentioned above. In such a device, of course, it is necessary to reduce the inertia of the moving portions of the system to an absolute minimum. In Fig. 5 there is illustrated, in a very schematic form, the way in which such a fast-acting device can be provided. The arrangement of Fig. 5 comprises a drum 190 which is driven by a motor 191. It will be understood that the drum 190 comprises heads of the same general nature of those described above. The drum 190 is utilized to drive a belt 192 which is effectively a continuous loop of tape which may hang free from the drum 190 but which, in the arrangement illustrated, is caused to collect in a random form in a basket 192. A pinch roller 193 is provided which is adapted to be pressed against the drum 190 by means of a piezoelectric expander element 194. When this expander element is supplied with energy from a suitable voltage source through flexible leads 195 and 196, this arrangement provides a very fast-acting operation for the pinch roller 193. Similarly, in order to stop the belt, a braking shoe 197 presses the tape against a suitable backing member 198. The braking shoe is also operated by a piezoelectric expander unit 199 which is supplied with a voltage from a suitable source of operating potential through flexible leads 200 and 201. It will be understood that a suitable indexing feature of the nature described in connection with Fig. 3 may also be provided for in the arrangement of Fig. 5 and that, in operation, it is only necessary to press pinch roller 193 against the drum 190 and release the braking roller 197 in order to cause the tape 192 to be driven at a very high speed. Conversely, when the pinch roller 193 is removed from the tape and the braking roller 197 applied thereto, a very fast-stopping action is effected.

It will be seen, therefore, that applicant, by each described embodiment of the invention, has provided a magnetic information-storing device which effectively comprises a plurality of sheet-like record members. Each described embodiment also includes a drum having a given axial dimension and a given circumferential dimension with a plurality of magnetic heads each having a transverse dimension which is small with reference to the axial dimension of the drum and the plurality of heads being effectively axially displaced in the surface of the drum. Figs. 1 and 3 also illustrate means for positioning the drum and a selected one of the sheet-like record members for a magnetic transducing operation by any of the heads. Also, Figs. 1 and 3 illustrate electrical signal-translating means which can be effectively connected to any one of the heads. This electrical signal-translating means can be either a recording amplifier, a reproducing amplifier, or an erasing amplifier. In connection with Figs. 1 and 3 there have also been described in detail means for driving the drum to cause the selected head to scan a given line on the selected sheet-like record in the above-mentioned dimension of the drum to effect a magnetic translation of the signal carried by the signal-translating means. This magnetic translation of the signal may be a recording of the signal, a reproduction of the signal, or an erasing of the signal. Thus the given line associated with the selected head on the selected one of the record members may be magnetically transduced, that is, recorded upon, reproduced from, or erased. Also, in Figs. 1 and 3 there have further been described arrangements in which the selected head is effective during only a selected portion of the time the selected given line is being scanned and, by this arrangement, only this selected portion of the scanned line is effective.

Also, for some applications, it will be advantageous to operate the magnetic record member over the drum with the magnetic coating on the record member on the outside so that this coating is not contacted by the drum. The reason that this is advantageous is that such magnetic coatings are usually very abrasive and much wear can be eliminated by the observance of this suggestion. Furthermore, it is usually desirable to provide a non-magnetic base material for the record member upon which is placed a suitable magnetic coating in a manner well understood by those skilled in the art. It will be understood that the base material itself can be magnetic or that the base material can be of non-magnetic metal with a suitable magnetic coating thereon. In some cases it may be desirable to provide a magnetic coupling between the head circuits contained in the drum and the circuits connected outside of the drum and thus eliminate the need for a commutator. Also, it will usually be found to be desirable to provide a system in which the active head is effective during only one revolution during the recording operation. This feature is desirable because, in any of the systems shown, the effective head continually scans the selected portion of the record member and the system would be faulty if a recording is made during more than one such scanning.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetic information-storing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means effectively connected to one of said heads; and means for rotating said drum with respect to said selected record member to cause said head to scan a given line on said selected record member in said circumferential dimension of said drum to effect a magnetic translation of the signal carried by said signal translating means; whereby the line associated with said head on selected ones of said record members may be magnetically transduced.

2. A magnetic information-storing device as set forth in claim 1, further characterized by means holding the selected sheet-like record member stationary while said drum rotates with respect thereto during scanning.

3. A magnetic information-storing device as set forth in claim 1, further characterized by sheet identifying means associated with each of the plurality of sheet-like record members, and said means for positioning said drum and a selected one of said sheet-like record members including means for locating a selected one of said sheets by said sheet identifying means.

4. A magnetic information-storing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means; means for effectively connecting a selected one of said heads to said signal-translating means; and means for rotating said drum with respect to said selected record member to cause the selected head to scan a given line on said selected record member in said circumferential dimension of said drum to effect a magnetic translation of the signal carried by said signal-translating means; whereby selected lines on selected ones of said record members may be magnetically transduced.

5. A magnetic information-storing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means effectively connected to one of said heads; means for rotating said drum with respect to said selected record member to cause said head to scan a given line on said selected record member in said circumferential dimension of said drum; and means for causing said signal-translating means and said one head to translate during only a selected portion of the time said given line is being scanned to effect a magnetic translation of the signal carried by said signal-translation means during only said selected portion of time; whereby selected portions of said line scanned by said head on selected ones of said record members may be magnetically transduced.

6. A magnetic information-storing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means; means for effectively connecting a selected one of said heads to said signal-translating means; means for rotating said drum with respect to said selected record member to cause the selected head to scan a given line on said selected record member in said circumferential dimension of said drum; and means for causing said signal-translating means and selected head to translate during only a selected portion of the time said given line is being scanned to effect a magnetic translation of the signal carried by said signal-translating means during only said selected portion of time; whereby selected portions of selected lines on selected ones of said record members may be magnetically transduced.

7. A magnetic recording device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; a source of signals to be recorded; means for effectively connecting a selected one of said heads to said signal source; and means for rotating said drum with respect to said selected record member to cause the selected head to scan a given line on said selected record member in said circumferential dimension of said drum to effect a magnetic recording of the signals supplied by said source; whereby selected lines on selected ones of said record member may have a magnetic record placed thereon.

8. A magnetic reproducing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; a signal-reproducer; means for effectively connecting a selected one of said heads to said signal reproducer; and means for rotating said drum with respect to said selected record member to cause the selected head to scan a given line on said selected record member in said circumferential dimension of said drum to effect a magnetic reproduction of the recorded material; whereby selected lines on selected ones of said record members may be reproduced.

9. A magnetic reproducing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; a signal reproducer; means for effectively connecting a selected one of said heads to said signal reproducer; and means for rotating said drum with respect to said selected record member to cause the selected head repeatedly to scan a given line on said selected record member in said circumferential dimension of said drum to effect a magnetic reproduction of the recorded material; whereby selected lines on said selected ones of said record members may be repeatedly reproduced.

10. A magnetic information-storing device as set forth in claim 9, further characterized by said means for positioning said drum and a selected one of said plurality of sheet-like record members for a magnetic transducing operation comprising individual sheet identification means associated with each sheet of said sheet-like record members, means for moving said record members, means for stopping said record members, selected means operable in conjunction with said identification means to select a desired sheet, and means connecting said selecting means to said means for stopping said record members.

11. A magnetic recording and reproducing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for any one of the types of operation known as recording, reproducing, and erasing by any of said heads; an electrical signal-translating means; means for effectively connecting a selected one of said heads to said signal-translating means to effect one of said types of operation; means for rotating said drum with respect to said selected record member to cause said selected head to scan a given line on said selected record member in said circumferential dimension of said drum so that said signal-translating means and said selected head effect said type of operation during the time said given line is being scanned; whereby selected lines on selected ones of said record member may be selectively recorded upon, reproduced from, or magnetically erased as desired.

12. A magnetic recording and reproducing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for any one of the types of operation known as recording, reproducing, and erasing by any of said heads; an electrical signal-translating means; means for effectively connecting a selected one of said heads to said signal-translating means to effect one of said types of operation; means for rotating said drum with respect to said selected record member to cause said selected head to scan a given line on said selected record member in said circumferential dimension of said drum; and means for causing said signal-translating means and said selected head to effect said type of operation during only a selected portion of the time said given line is being scanned; whereby selected portions of selected lines on selected ones of said record member may be recorded upon, reproduced from, or magnetically erased as desired.

13. A magnetic information-storing device comprising: a plurality of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for effectively pulling a selected one of said record members into position on said drum and wrapping said selected member around said drum for a magnetic transducing operation by any of said heads; an electrical signal-translating means; means for effectively connecting a selected one of said heads to said signal-translating means; and means for rotating said drum with respect to said selected record member to cause the selected head to scan a given line on said selected record member in said circumferential dimension of said drum to effect a magnetic translation of the signal carried by said signal-translating means; whereby selected lines on selected ones of said record members may be magnetically transduced.

14. A magnetic information-storing device comprising: a book of loose-leaf sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means; means for effectively connecting a selected one of said heads to said signal-translating means; and means for rotating said drum with respect to said selected record member to cause the selected head to scan a given line on said selected record member in said circumferential dimension of said drum to effect a magnetic translation of the signal carried by said signal-translating means; whereby selected lines on selected ones of said record members may be magnetically transduced.

15. A magnetic information-storing device comprising: a belt of sheet-like record members; a drum having a given axial dimension and a given circumferential dimension; a plurality of magnetic heads each having a transverse dimension which is small with reference to said axial dimension of said drum and the plurality of heads being effectively axially displaced in the surface of said drum; means for positioning said drum and a selected one of said record members for a magnetic transducing operation by any of said heads; an electrical signal-translating means; means for effectively connecting a selected one of said heads to said signal-translating means; and means for rotating said drum with respect to said selected record member to cause the selected head to scan a given line on said selected record member in said circumferential dimension of said drum to effect a magnetic translation of the signal carried by said signal-translating means; whereby selected lines on selected ones of said record members may be magnetically transduced.

16. A magnetic information-storing device as set forth in claim 15, further characterized by said means for positioning said drum and a selected one of said record members for a magnetic transducing operation includes means for moving said belt, means for selecting the sheet to be indexed for translation, and means for stopping the selected sheet adjacent said drum.

17. A magnetic information-storing device as set forth in claim 15, further characterized by said belt of sheet-like record members comprising an opaque strip which is long compared to its width and by having transparent sheet identifying portion means, and the means for positioning said drum and a selected one of said record members for a magnetic transducing operation comprises a photocell device whose light beam projects through said transparent sheet identifying portion means, and means connecting said photocell device to said means for positioning said drum and a selected one of said record members for the transducing operation.

18. A magnetic information-storing device comprising: a belt of sheet-like record members; a drum having a given axial dimension and a given circumferential dimension; a plurality of magnetic heads each having a transverse dimension which is small with reference to said axial dimension of said drum and the plurality of heads being effectively magnetically displaced in the surface of said drum; means for causing said drum to drive said belt; means for decreasing the speed of said belt with relation to the speed of said drum to cause a selected one of said record members to be positioned for a magnetic transducing operation by any of said heads; an electrical signal-translating means; means for effectively connecting a selected one of said heads to said signal translating means to cause the selected head to scan a given line on said record member in said circumferential dimension of said drum and effect a magnetic translation of the signal carried by said signal translating means; whereby selected lines on selected ones of said record members may be magnetically transduced.

References Cited in the file of this patent

UNITED STATES PATENTS

| | | |
|---|---|---|
| 1,941,618 | Nemirovsky | Jan. 2, 1934 |
| 2,080,100 | Tauschek | May 11, 1937 |
| 2,124,906 | Bryce | July 26, 1938 |
| 2,178,706 | Severy | Nov. 7, 1939 |
| 2,254,933 | Bryce | Sept. 2, 1941 |
| 2,519,725 | White | Aug. 22, 1950 |
| 2,530,029 | Pond | Nov. 14, 1950 |
| 2,549,071 | Dusek | Apr. 17, 1951 |
| 2,596,741 | Tyler | May 13, 1952 |
| 2,620,389 | Potter | Dec. 2, 1952 |
| 2,650,830 | Potter | Sept. 1, 1953 |